(12) United States Patent
Hauck

(10) Patent No.: US 10,539,453 B2
(45) Date of Patent: Jan. 21, 2020

(54) WEIGHING SENSOR FOR A SCALE

(71) Applicant: Minebea Intec Aachen GmbH & Co. KG, Aachen (DE)

(72) Inventor: Timo Hauck, Kaiserslautern (DE)

(73) Assignee: MINEBEA INTEC AACHEN GMBH & CO. KG, Aachen (DE)

( * ) Notice: Subject to any disclaimer, the term of this patent is extended or adjusted under 35 U.S.C. 154(b) by 245 days.

(21) Appl. No.: 15/476,034

(22) Filed: Mar. 31, 2017

(65) Prior Publication Data

US 2017/0284857 A1 Oct. 5, 2017

(30) Foreign Application Priority Data

Apr. 2, 2016 (DE) .......................... 10 2016 106 048

(51) Int. Cl.
*G01G 21/23* (2006.01)

(52) U.S. Cl.
CPC .................................... *G01G 21/23* (2013.01)

(58) Field of Classification Search
CPC .......... G01G 7/02; G01G 21/23; G01G 21/24; G01G 21/244
See application file for complete search history.

(56) References Cited

U.S. PATENT DOCUMENTS

| | | | | |
|---|---|---|---|---|
| 4,010,638 A | * | 3/1977 | Gallo | G01G 3/165 73/862.59 |
| 6,365,847 B1 | * | 4/2002 | Muller | G01G 7/02 177/210 EM |
| 7,534,971 B2 | * | 5/2009 | Kuhlmann | G01G 21/244 177/210 EM |
| 9,188,475 B2 | * | 11/2015 | Gottfriedsen | G01G 3/00 |
| 9,915,558 B2 | * | 3/2018 | Gottfriedsen | G01G 7/02 |
| 2004/0003948 A1 | * | 1/2004 | Kuhlmann | G01G 21/244 177/132 |
| 2006/0096790 A1 | * | 5/2006 | Muehlich | G01G 21/244 177/210 EM |
| 2007/0034419 A1 | * | 2/2007 | Kuhlmann | G01G 7/04 177/136 |
| 2009/0065265 A1 | * | 3/2009 | Hauck | G01G 21/07 177/210 EM |

(Continued)

FOREIGN PATENT DOCUMENTS

DE 10024017 A1 7/2001

OTHER PUBLICATIONS

Search Report from German Application No. 102016106048.8 dated Oct. 19, 2016, 10 pages.

*Primary Examiner* — Natalie Huls
(74) *Attorney, Agent, or Firm* — Brundidge & Stanger, P.C.

(57) ABSTRACT

In a weighing sensor for a scale, comprising a base (1), a load receiver (4) jointedly linked to the base (1) by means of a parallelogram linkage, and a lever mechanism having at least two force transmitting levers each having a load arm (14, 23, 28, 35, 39, 46, 54) and an force arm (19, 30, 38), the force transmitting levers (8, 9, 36, 40, 50) being supported by means of supporting joints (17, 24, 29, 37, 42, 48, 55, 60) defining supporting joint pivot points on the base (1), and being arranged one behind the other as seen in the longitudinal direction of the weighing sensor, it is provided that all force transmitting levers (8, 9, 36, 40, 50) are two-sided levers.

19 Claims, 5 Drawing Sheets

(56) References Cited

U.S. PATENT DOCUMENTS

| | | | |
|---|---|---|---|
| 2011/0147099 A1* | 6/2011 | Burkhard | G01G 21/00 177/246 |
| 2012/0312069 A1* | 12/2012 | Burkhard | G01G 23/012 73/1.13 |
| 2013/0233045 A1* | 9/2013 | Burkhard | G01G 7/04 73/1.13 |
| 2014/0020960 A1* | 1/2014 | Metzger | G01G 1/18 177/1 |

* cited by examiner

Detail X

WEIGHING SENSOR FOR A SCALE

The invention relates to a weighing sensor according to the preamble of claim 1.

A weighing sensor of this type is known from EP 1 195 588 B1. The first force transmitting lever loaded by the load receiver via a coupling element is formed as a two-sided lever, while the second force transmitting lever leading to a force compensation means is a one-sided lever. This construction entails that the first force transmitting lever is supported on a portion of the base arranged above the first force transmitting lever while the supporting joint of the second force transmitting lever is supported on a portion of the base arranged below the second force transmitting lever. This makes the structure complex. There are no coupling elements between the force transmitting levers so that linearity errors or transmission errors can occur. Moreover, the joint between the force arm of the first force transmitting lever and the load arm of the second force transmitting lever has a compressive force applied to it which is disadvantageous since the joints have to have corresponding high buckling strength.

DE 199 23 208 C1 discloses machining of the essential parts of the weighing sensor from a single block. The weighing sensor has a top and bottom parallelogram link between which a base cantilever protrudes out from a base. The base body and the base cantilever commonly form the base. A lever mechanism is provided having three force transmitting levers serving for force reduction of a force applied via a load receiver towards a force compensation means. Two of the levers are formed as bell crank levers (bell cranks) so that the force and load arms are oriented sometimes parallel and sometimes perpendicular to the direction of gravity. The weighing sensor has a structure symmetrical to a mirror plane defined by the direction of the longitudinal extension of the weighing sensor and the direction of gravity, and extends central to the weighing sensor. The symmetrical structure is basically advantageous to distribute mechanical loads as evenly as possible within the weighing sensor and in particular in the force transmitting levers. To achieve symmetrical arrangement, the force transmitting levers are partially subdivided and extend on both sides of the base cantilever. To achieve this, a great number of undercuts is necessary, which is disadvantageous for manufacture. The arrangement of the force transmitting levers disclosed in DE 199 23 208 C1 has the additional disadvantage that one of the coupling elements which acts directly between two adjacent force transmitting levers has a compressive load applied to it. Furthermore, the vertical orientation, i.e. the orientation in the direction of gravity, of load or force arms is disadvantageous, because it necessarily entails a high structural design if high reductions are to be achieved.

DE 195 40 782 C1 also discloses a weighing sensor to be manufactured from a monolith, including two force transmitting levers formed as bell crank levers. The force arm of one of the force transmitting levers extends in the direction of gravity which causes the above-described drawbacks for the structural height.

DE 10 2006 002 711 B3 discloses a weighing sensor having three force transmitting levers formed as straight levers having essentially parallel lever orientations, namely in the horizontal direction. Two of these force transmitting levers are formed as one-sided levers. All of the coupling elements are loaded on tesion in the direction towards the force transmitting levers when they are loaded. The force transmitting levers are arranged by means of coupling elements that have a very long extension and are vertically oriented, however arranged around the base, i.e. above, below and to the side of the base. This leads to a great structural height, despite the horizontal orientation of the force transmitting levers. Moreover, the structure is quite complex and has a great number of undercuts.

EP 1 706 713 B1 discloses a weighing sensor having three force transmitting levers formed as three straight levers that are horizontally oriented which, however, are arranged one below the other by means of relatively long vertically oriented coupling elements, thus making a high structure necessary. The central force transmitting lever is formed as a one-sided lever. At least one of the coupling elements connecting the force transmitting levers is loaded under pressure. Moreover, for the structure to be as free as possible of undercuts, it has to be asymmetrical.

EP 1 550 849 B1 discloses a weighing sensor having three force transmitting levers formed from an integrally connected material block by means of machining thin sections. The force transmitting levers are arranged one above the other with the already described drawbacks for the structural height.

EP 0 518 202 B1 also discloses a weighing sensor having its system created of three force transmitting levers arranged one below the other by means of creating thin sections out of a single block. The third force transmitting lever is extended towards the force compensation means by means of extension pieces.

DE 100 54 847 C2 discloses a weighing sensor including two force transmitting levers formed as bell crank levers between the load receiver and the force compensation means. The second force transmitting lever leading toward the force compensation means is a one-sided lever. The load arm of the first force transmitting lever is extended and leads to the support for an adjustment weight.

It is thus the object of the present invention to provide a weighing sensor of the initially mentioned type which has an alternative structure with respect to the state of the art and, in particular, has a low structural height and can be manufactured in a simple manner.

The technical problem is solved by the characterizing features of claim 1. Advantageous embodiments of the weighing sensor according to the present invention can be derived from the dependent claims.

Claim 1, in its characterizing features, provides the creation of the lever mechanism in such a manner that two adjacent force transmitting levers are formed as two-sided levers.

Two subsequent, i.e. adjacent, force transmitting levers formed as two-sided levers, can both have the same orientation with respect to the base and can be supported each having their supporting joints on the same side of, for example above, the base. In addition, a system with two-sided levers can be designed such that all solid body joints, which are applied at the ends of the load arms or the force arms, are loaded on tension, when a load is applied.

In an advantageous embodiment of the weighing sensor according to the present invention, the force transmitting levers can be formed as straight levers, preferably oriented parallel to each other. Forming a force transmitting lever as a straight lever does not necessarily mean that its lever arms themselves have a straight extension.

In an ideally straight lever, it should be observed, however, that the point of application of the load on the load arm (load application point) usually provided by the pivot of the joint, the pivot of the supporting joint and the point of application of the force arm, usually also provided by the pivot point of the joint (force arm application point), on a following element are on a common straight line. Slight deviations from this arrangement are immaterial. The slight deviation is still immaterial when the direction of the straight line extending through the load application point and the pivot of the supporting joint does not deviate by more than 15° from a straight line of the same force transmitting lever extending through the pivot of the supporting joint and the force arm application point. It is thus also conceivable for the pivots of the supporting joints of the lever and the application points of the load and the output force to be not exactly on a straight line and thus at a slight angle within the force transmitting lever. The preferably parallel orientation of two force transmitting levers means that the straight line extending through the pivot of the supporting joint and the application points of one lever is parallel to the one of the other force transmitting lever. Again, deviations of up to 15° from the parallel orientation are immaterial.

A structure having at least two force transmitting levers arranged one behind the other, oriented parallel to each other and acting as straight levers enables a very flat structure for the weighing sensor while at the same time enabling a high reduction within the entire lever mechanism.

A low structural height can be achieved, in particular, if the pivots of the supporting joints of at least two of the force transmitting levers are arranged in a common, preferably horizontal plane during use of the weighing sensor. Moreover, manufacture that is completely free or at least essentially free of undercuts can be achieved with the arrangement of the force transmitting levers according to the invention. For manufacture, machining tools, such as a mill, can be used—at least as far as rougher structures are concerned. Alternatively or additionally, other manufacturing methods, such as wire erosion or laser cutting, which are advantageous, in particular, for finer structures, can be used. It is also possible to combine the manufacturing methods.

The weighing sensor according to the invention can also be configured in such a manner that the force transmitting levers are arranged perpendicular to the effective load.

In a preferred embodiment comprising at least a third force transmitting lever, high pre-loads can be compensated due to the multiplying transmissions. The third force transmitting lever is also preferably formed as a two-sided lever. It can also be advantageous to form the third force transmitting lever as a straight lever. A flat structure can be achieved, in particular, by a structure in which the at least three force transmitting levers are arranged one behind the other as seen in the longitudinal direction of the weighing sensor.

The longitudinal direction of the weighing sensor is perpendicular to the direction of a load acting on the load receiver.

The weighing sensor according to the invention can also be configured in such a manner that a load joint having a load joint pivot can be arranged on a load arm of at least one of the force transmitting levers which transmits force when a load is received, and the pivot of the load joint of the associated force transmitting lever is in a common supporting plane with the supporting joint pivot, wherein the supporting plane is essentially parallel to the link plane of the parallelogram link of the non-loaded parallelogram linkage.

The pivot of the load joint defines the application point of the load on the load arm. The links of the parallelogram linkage are preferably fixed in parallel to each other on the base on the one hand and on the load receiver on the other by means of solid body joints. In this configuration, the link planes are defined by the direction of the longitudinal extension of the link-solid body joints and the direction of the longitudinal extension of the weighing sensor. In the regular use of the weighing sensor, the link planes extend perpendicular to the direction of gravity without the application of the load. If the pivot of the load joint and the pivot of the supporting joint are arranged in a plane perpendicular to the direction of gravity, a possible reduction error by non-linearity is avoided.

The weighing sensor according to the invention can also be configured in such a manner that at least one coupling element is arranged between the load receiver and the first force transmitting lever and/or between force transmitting levers adjacent to each other, wherein in each coupling element, each connection to the load receiver or to the force transmitting lever is realized via a coupling-element joint. Preferably, at least one coupling element is arranged between each of said load receiver and the first force transmitting lever and between all said force transmitting levers adjacent to each other. The coupling-element joint acting on a load arm will then be the load joint. The coupling-element joint which acts directly or indirectly on the load receiver will also be called a load-receiver coupling joint in the following, and the coupling-element joint directly acting on the force arm will also be called a force-arm coupling joint. The force-arm coupling joint forms each application point of force on the force arm.

Omitting a coupling element provided with two coupling-element joints between two adjacent force transmitting levers will have the consequence that the pivots of these force transmitting levers are not decoupled from each other. This leads to measuring errors which, however, may be tolerable depending on the construction, such as with dynamic weighing processes. Without a coupling element, adjacent force transmitting levers can be connected to each other via a single joint.

It is also possible for all coupling elements to be aligned parallel to each other. At the same time, it is possible that the coupling elements are arranged parallel to a direction of a force acting in the region of the load receiver.

The weighing sensor according to the invention can also be characterized by at least one pair of coupling elements arranged parallel to each other, arranged adjacent to each other and connected to the same arm, load arm or force arm of one of the force transmitting levers, wherein the arm protrudes into the coupling element space left between the two coupling elements of the pair.

By these means, the coupling elements of the coupling-element pair extend on both sides of the arm, preferably the load arm, of the corresponding force transmitting lever. Each coupling element of the pair is connected to a coupling-element joint, in the case of the load arm that is a load link, with the arm of the force transmitting lever. This structure enables the arrangement of the pertinent coupling-element joint on the same level, i.e. in a common plane parallel to the link plane of the non-displaced parallelogram linkage with the supporting joint of the relevant force transmitting lever. This helps to avoid transmission errors or linearity errors. Moreover, an extremely space-saving structure is made possible.

It is possible to configure the coupling-element pair in such a way that the two coupling elements are joined, for example, above the surrounded arm of the force transmitting lever and jointedly linked, together with a common coupling-element joint, to a further component of the weighing sensor, for example to an arm of an upstream force transmitting lever. The common coupling-element joint is thus a force-arm coupling joint if the connection to a force arm of the upstream force transmitting lever is established. The two coupling elements can also be left separate, however, and jointedly linked, with separate coupling-element joints, to further components of the weighing sensor. If the further component is an arm of an upstream force transmitting lever, this arm can also be forked into two partial arms, wherein each partial arm is jointedly linked, via a coupling-element joint, to the associated coupling element of the coupling-element pair.

The weighing sensor according to the invention can be configured such that at least one of the coupling-element joints is a solid body joint. This enables monolithic manufacture of the weighing sensor or at least of an essential portion thereof.

It can be advantageous to configure the weighing sensor according to the invention in such a manner that each coupling element is loaded on tension when a load is received in a preferred loading direction. This is advantageous, in particular, when the coupling-element joints are formed as solid body joints which can withstand higher forces on tensile load rather than on compressive load. While, physically speaking, the tensile or compressive load is the same on the cross-sectional area of the joint, there is a difference in that there is a risk of the coupling rod buckling when compressive load is applied to it.

It is still possible, however, to apply a load to the load receiver from a direction opposite to the preferred loading direction. In this case, all coupling elements would have a compressive load applied to them. It is advantageous if the type of loading is the same for all coupling elements.

The weighing sensor according to the present invention can also be configured that on a load each coupling element transmits the force parallel to the loading direction. In the usual use of the weighing sensor the loading direction corresponds to the direction of gravity. It can also be provided for all coupling elements to be oriented parallel to each other.

It can be advantageous to configure the weighing sensor according to the invention in such a manner that at least the load receiver, the base, the parallelogram linkage and the force transmitting levers, with the exception of an optional extension of an force arm extending to a force compensation means, are integrally formed. A monolithic structure can thus be achieved.

It can be advantageous to configure the weighing sensor according to the invention in such a manner that the load receiver, the base, the parallelogram linkage and the force transmitting levers are symmetrical to a center plane which, in the use of the weighing sensor, is defined by the longitudinal direction of the weighing sensor and a tangent on the pivoting motion of the parallelogram linkage.

The weighing sensor according to the invention can also be configured such that a lever extension is arranged on the force arm of the force transmitting lever most remote from the load receiver. The lever extension can be fixed, for example, by material bonded connection or positive locking means, such as by means of screws.

Finally, the weighing sensor according to the invention can be configured such that at least one of the parallelogram links of the parallelogram linkage and/or at least one of the linkage joints and/or the base has an opening allowing tool access to at least a part of the lever mechanism. If the manufacture of the weighing sensor still requires individual undercuts, in particular in the area of the lever mechanism, they can be achieved by inserting tools through the opening.

Undercuts can result, for example, due to the forking of one of the lever arms or due to the formation of a coupling-element pair.

A preferred exemplary embodiment of the weighing sensor according to the invention will be schematically shown with reference to two figures, wherein.

Figure 1:
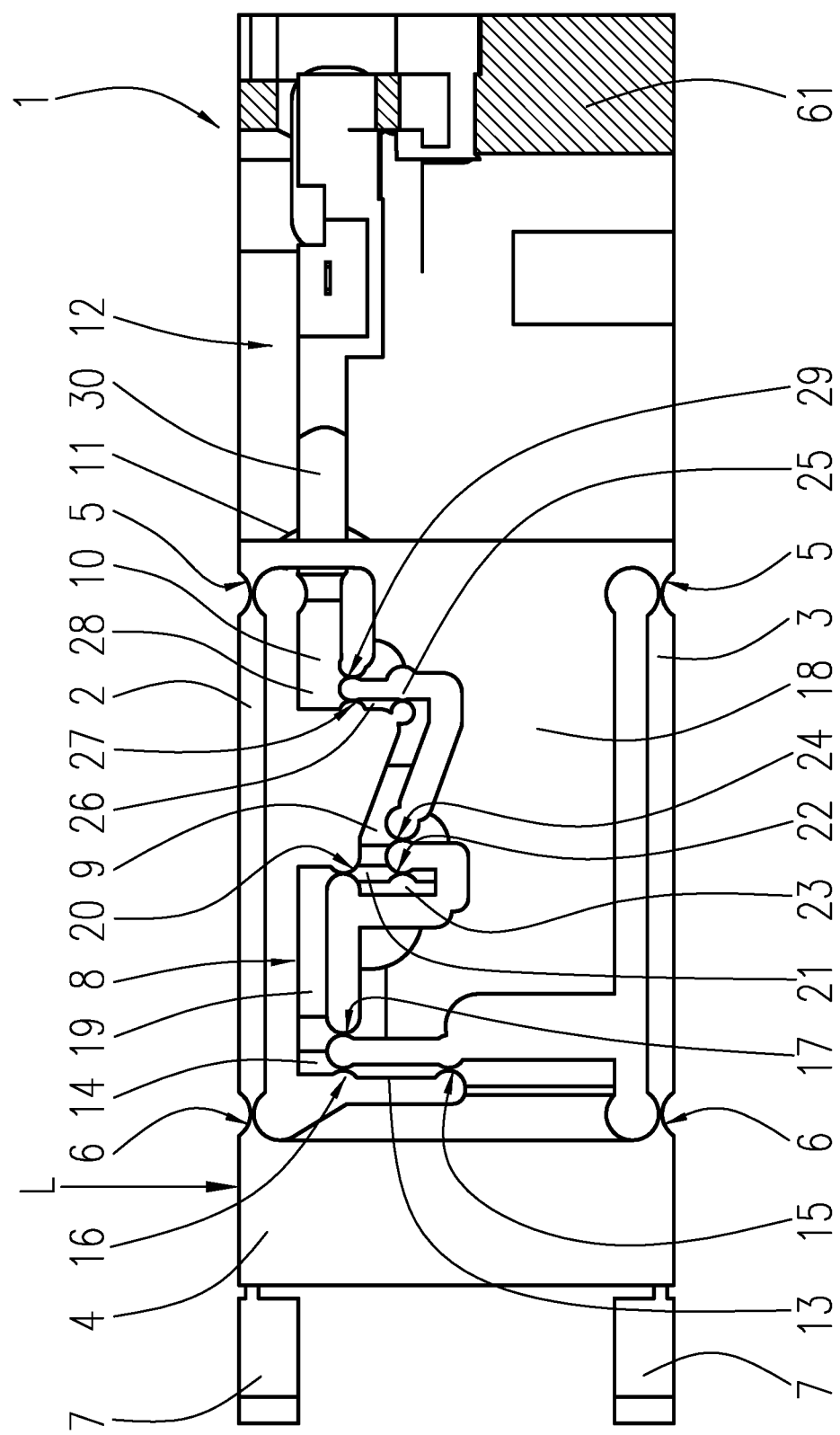
FIG. 1 shows the embodiment of the weighing sensor in a side view.
Figure 2:
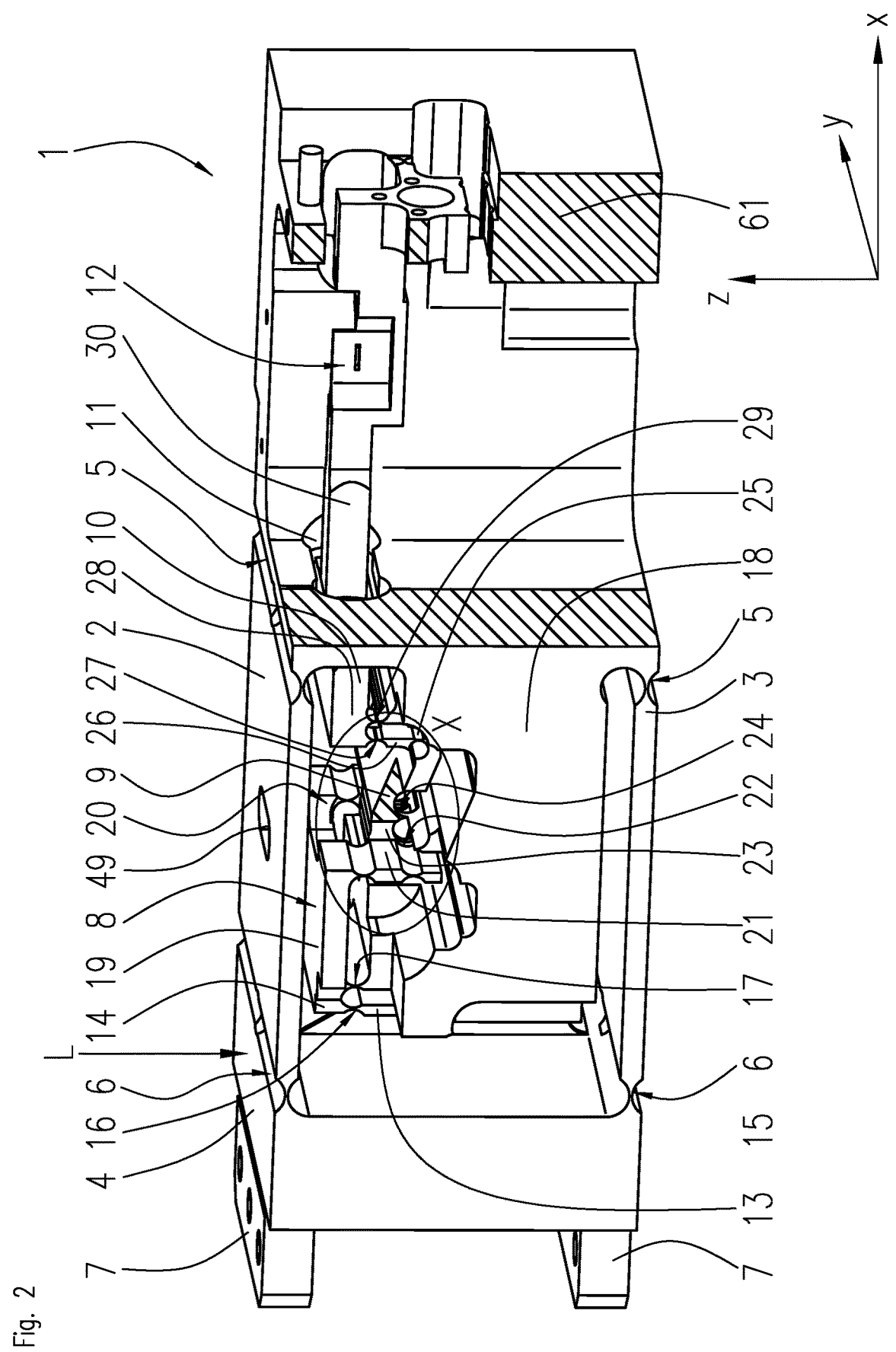
FIG. 2 shows the weighing sensor according to FIG. 1 in an oblique perspective view.

The weighing sensor in the embodiment according to FIGS. 1 and 2 has a symmetrical structure with respect to a mirror plane defined by the X axis and the Z axis, centrally extending in the longitudinal direction of the weighing sensor. The areas that are crosshatched in the figures represent section edges to enable viewing of the interior.

The weighing sensor has a base 1 comprising a fixed part referred to as a base body 61, which in use is fixed to a base unit (not shown) of a weighing machine. The base body 61 is connected to a load receiver 4 via a top parallelogram link 2 and a bottom parallelogram link 3. The parallelogram links 2 and 3 are connected to the base body 61 via first link joints 5 and to the load receiver 4 via second link joints 6. The link joints 5 and 6 preferably formed as solid body joints enable the load receiver 4 to be displaced with respect to the base body 1. Holding elements 7 protruding in the manner of a cantilever are provided on the load receiver 4, which can serve for fixing, such as by means of screw connections, of further elements (not shown), for example a weighing platform. The holding elements 7 protruding in the manner of a cantilever are not indispensable, since a weighing platform or any other element can also be directly screwed onto an accessible side of the load receiver.

The lever mechanism consisting of three force transmitting levers 8, 9 and 10 is arranged between the load receiver 4 and the base body 61, wherein the force transmitting levers 8, 9 and 10 are formed as straight levers. The force transmitting levers 8, 9 and 10 are essentially parallel to each other and perpendicular to the direction of an effective load L. The lever mechanism thus comprises a first force transmitting lever 8, a second force transmitting lever 9 and a third force transmitting lever 10, wherein the third force transmitting lever 10 protrudes into an open interior space 12 of the base body 61 through a cutout 11. Alternatively, the third force transmitting lever 10 can extend completely through the base body 61 through a cutout. The third force transmitting lever 10 can be provided for mounting a force compensating component, such as a magnet, or a force receiving element, such as a string. In the case of a force-receiving string, the third force transmitting lever 10 pulls on the string which, in turn, increases the resonant frequency and thus, by means of a frequency exciter, allows conclusions to be drawn on the weight applied over a certain time unit by applying computational methods.

The third force transmitting lever 10 according to FIGS. 1 and 2 symmetrically extends on the base 1 and also forms a monolithic structure with the base 1. Alternatively, the third force transmitting lever 10 can extend asymmetrically or even laterally along the base. The third force transmitting lever 10 can also be screwed on.

In a structure having less or more than three force transmitting levers, what is discussed with respect to the third force transmitting lever 10 then also applies to the force transmitting lever within the lever mechanism leading up to the force compensation means.

The following is a presentation of the further structure with reference to an exemplary functioning principle of the weighing sensor. When the load receiver 4 is loaded with a load L, the load receiver 4 has a force applied to it relative to the base 1. The applied force results in minimal displacement due to the lever mechanism, which is immediately compensated, however, by means of force compensation, such as by means of coils and magnets, thus restoring the same position to the system and thus to the load receiver.

The force of the applied load L is transmitted to a load arm 14 of the first force transmitting lever 8 via a coupling element 13. The coupling element 13 is jointedly linked to the load receiver 4 via a load-receiver coupling joint 15 (only visible in FIG. 1). A load joint 16 is provided between the coupling element 13 and the load arm 14. The first force transmitting lever 8, via a first supporting joint 17, is supported on a base cantilever 18 extending from the base body 61 towards the load receiver 4. The pivot point of the first supporting joint 17 and the pivot point of the first load joint 16 lie in a common horizontal plane.

Figure 2A:
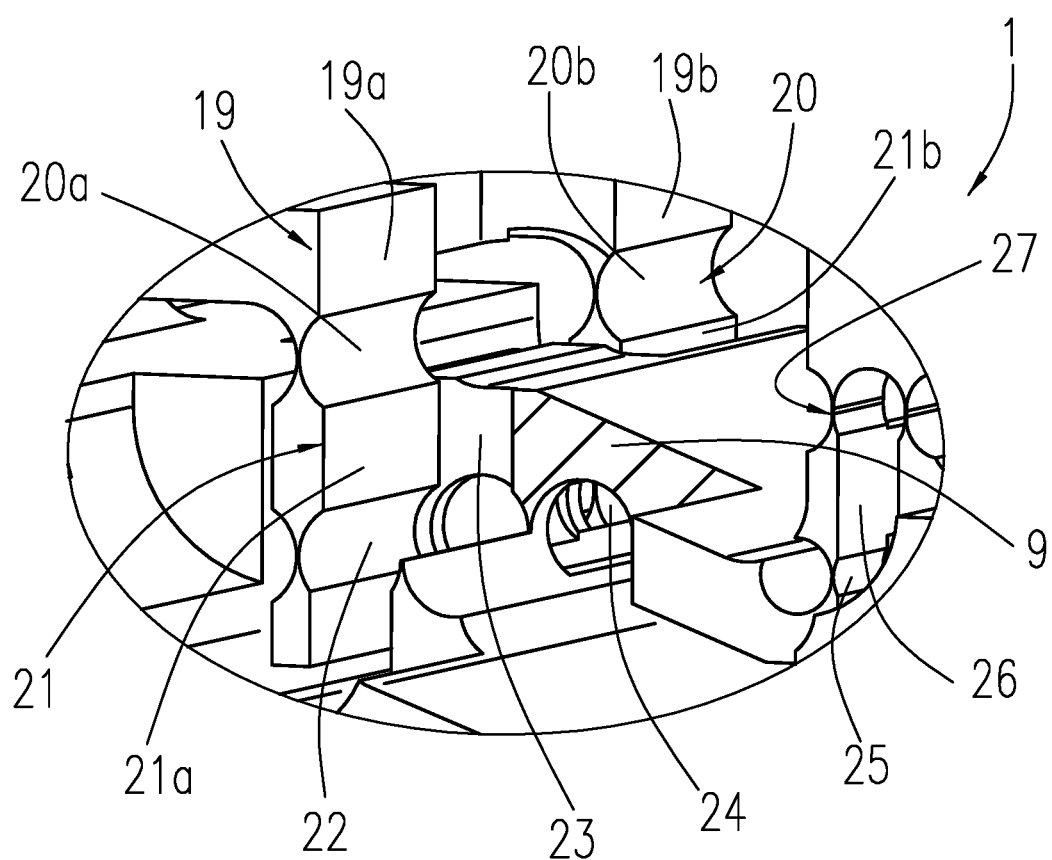
FIG. 2a shows a detailed view of the weighing sensor according to FIG. 1 in the area of the coupling-element pair.

A force arm 19 of the first force transmitting lever 8 is split in a fork-like manner into two separate partial force arms 19a and 19b (only visible in the detailed view of FIG. 2A) each of which is connected to a further coupling element 21a and 21b (only visible in FIG. 2A) via an force-arm coupling joint 20a and 20b, respectively (also only visible in FIG. 2A), wherein each further coupling element 21a and 21b, in turn, is connected to a load arm 23 of the second force transmitting lever 9 via a load joint 22 (of which the figures only show one). The coupling elements 21a and 21b thus form a coupling-element pair which extends on both sides of the load arm 23.

The second force transmitting lever 9 is supported on the base cantilever 18 via a second supporting joint 24 and is connected to a further coupling element 26 via a further force-arm coupling joint 25. The coupling element 26 is finally connected to a load arm 28 of the third force transmitting lever 10 via a load joint 27, the force transmitting lever 10, in turn, being supported on the base cantilever 18 via a third supporting joint 29. The force arm 30 protruding into the interior 12 of the base body 61 extends up to a force compensation means (not shown) which cooperates with the force arm 30 in a well-known manner.

All coupling elements 13, 21, 26 are parallel to each other and parallel to a force L acting on the load receiver 4.

The top parallelogram link 2 includes a tool access opening 49 which can serve to finalize the coupling elements 21a and 21b, since they have to be separated from the load arm 23 up to the joint 22 by means of an undercut. A further tool access opening (not shown in the drawings) can be present in the region of the cutout 11 vertically from the top, for example to mount a lever extension (not shown) on the force arm 30 of the third force transmitting lever 10.

Figure 3:
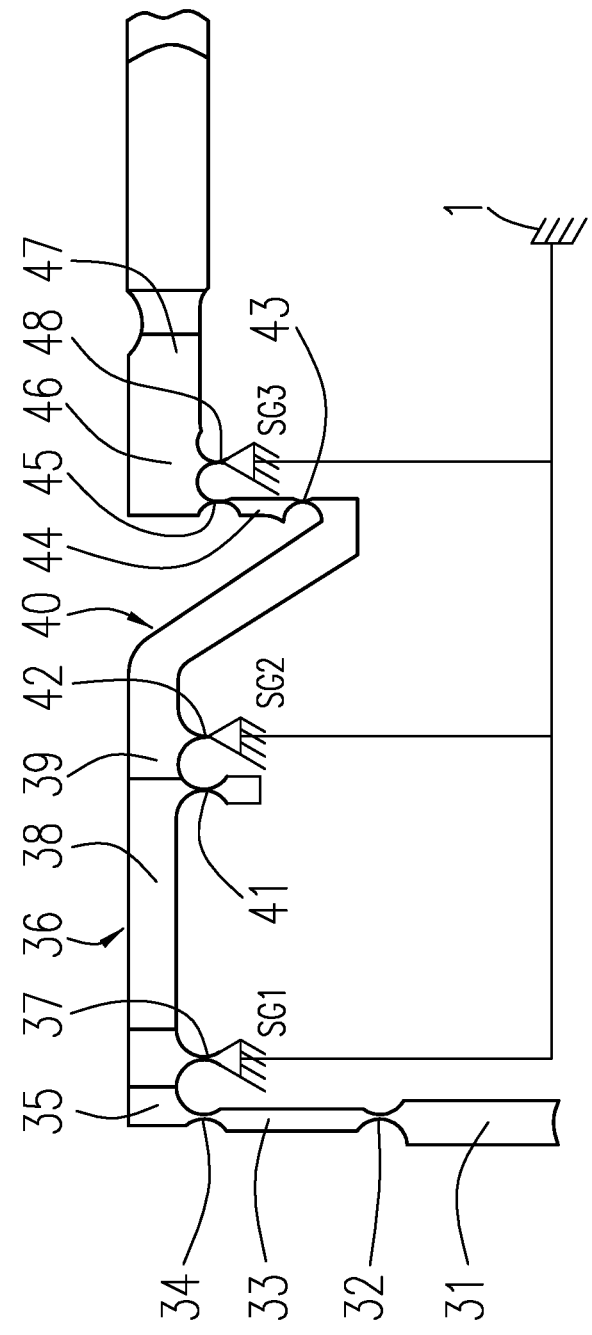
FIG. 3 shows the lever mechanism of a second embodiment of the invention.
Figure 4:
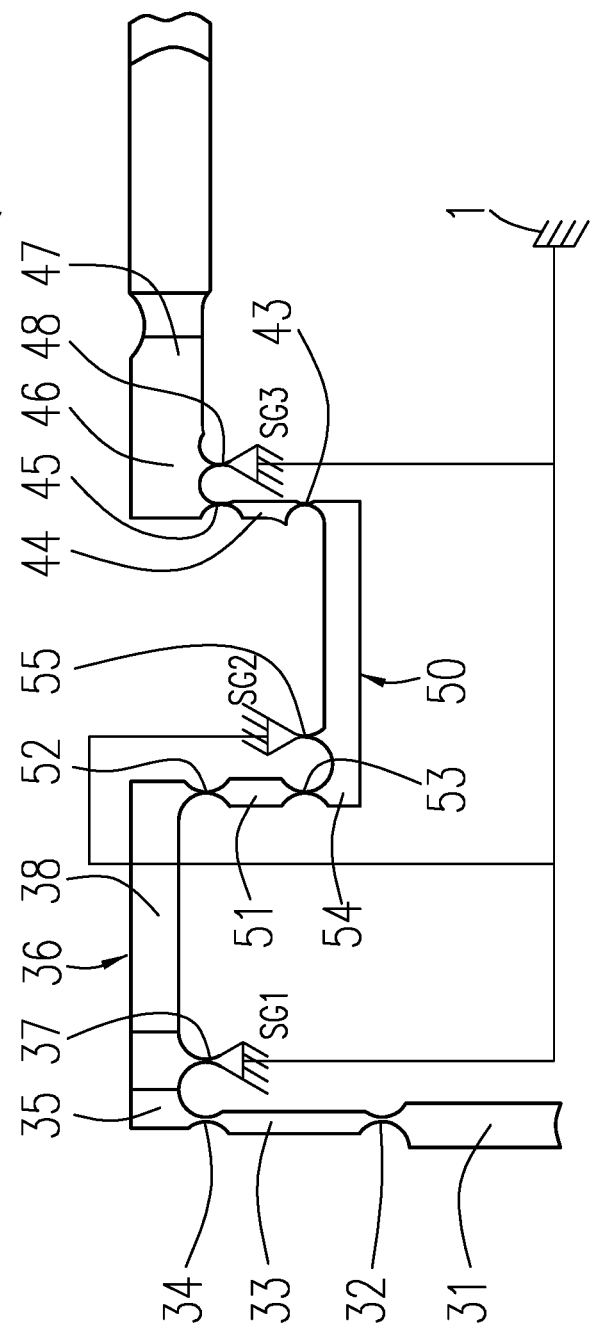
FIG. 4 shows the lever mechanism of a third embodiment according to the invention.
Figure 5:
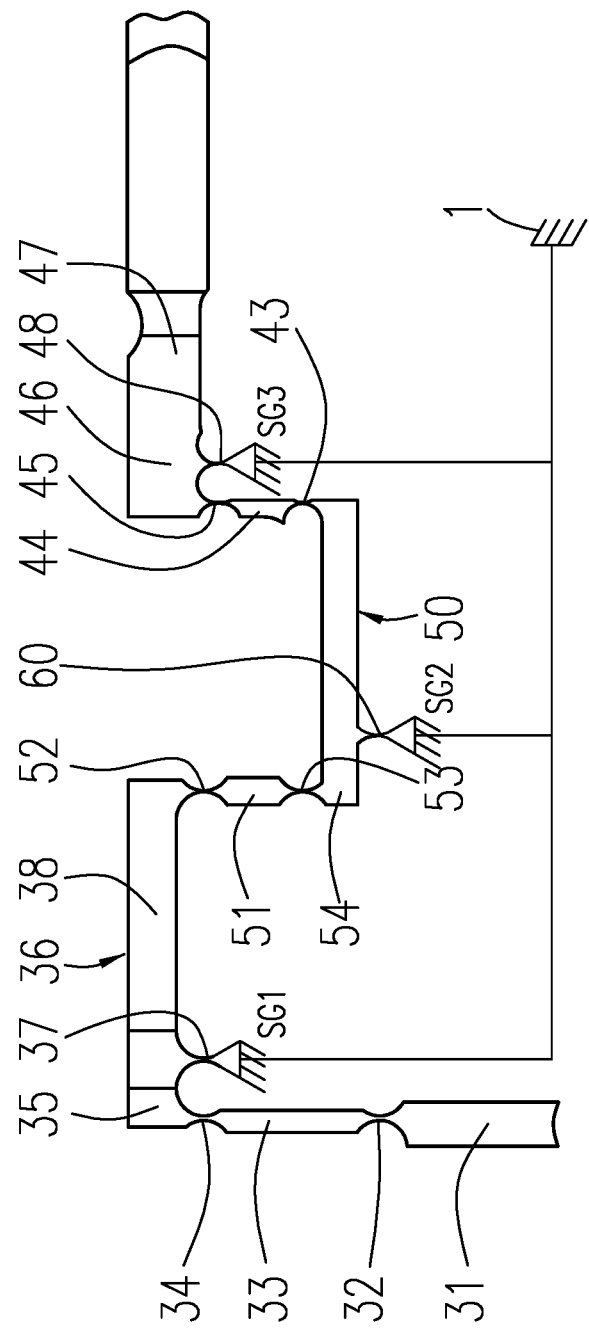
FIG. 5 shows the lever mechanism of a fourth embodiment according to the invention.

FIGS. 3 to 5 show alternative embodiments of the lever mechanism, wherein, to simplify the drawing, the surrounding base 1 and the base cantilevers 18 (see FIGS. 1 and 2) are only schematically shown with support points (SG1-SG3).

In the embodiment according to FIG. 3, a cantilever 31 of the load receiver (not shown) is connected to a coupling element 33 via a load-receiver coupling joint 32, the coupling element 33, in turn, being connected to the load arm 35 of a first force transmitting lever 36 via a load joint 34. The first force transmitting lever 36 is supported on the base cantilever via a first supporting joint 37. An force arm 38 of the first force transmitting lever 36 is split in a fork-like manner, which is not visible in the figure, at its leading end into two force arm portions, similar to the split of the force arm 19 in FIG. 1, and receives a portion of the load arm 39 of the second force transmitting lever 40 between the partial force arms. The force arm 38 of the first force transmitting lever 36 and the load arm 39 of the second force transmitting lever 40 are connected to each other via a pair of force-arm coupling joints 41, of which only the leading one is shown in perspective.

The second force transmitting lever 40 is supported on the base cantilever via the second supporting joint 42.

The second force transmitting lever 40, also formed as a straight two-sided lever and essentially oriented parallel to the other force transmitting levers 36, 47, is connected to the load arm 46 of the third force transmitting lever 47 via a further force-arm coupling joint 43, a further coupling element 44 parallel in orientation both to the coupling element 33 and to the direction of the application of force L, and a load joint 45, the third force transmitting lever 47 being supported on the base cantilever 18 via the third supporting joint 48. The lever mechanism according to FIG. 3 is different from the embodiment according to FIGS. 1, 2 and 2a with respect to the type of coupling between the first force transmitting lever 36 oriented perpendicular to the direction of the application of and the second force transmitting lever 40 oriented perpendicular to the direction of the applied load L. At this point, a coupling element has been dispensed with, so that only one joint, namely the force-arm coupling joint 41, is provided between the first force transmitting lever 36 and the second force transmitting lever 40. The pivot point of the supporting joint 42 and the pivot point in the force-arm coupling joint 41 are thus not decoupled. This can lead to measuring errors, which can be negligible, however, for certain applications, in particular for dynamic weighing.

At this point, it should be noted that a base cantilever of the type shown does not necessarily have to be present. Alternatively, it is possible for the base to be arranged completely below the lever mechanism and, as the case may be, for a force compensation means to be mounted on the base by means of additional elements.

FIG. 4 describes a further embodiment, wherein elements used in a corresponding manner to the embodiment according to FIG. 3 are indicated with the same reference numerals. With respect to the description, reference is made, in particular, to the explanations relating to FIG. 3. In contrast to the embodiment according to FIG. 3, the second force transmitting lever 50, also oriented parallel to the force transmitting levers 36, 46 and perpendicular to the applied load L, is connected to the force arm 38 of the first force transmitting lever via a coupling element 51 in turn oriented parallel to the other coupling elements 33, 44 and parallel to the direction of the applied load L. The coupling element 51 has a force-arm coupling joint 52 for connection to the force arm 38 of the first force transmitting lever 36 and a load joint 53 for connection to the load arm 54 of the second force transmitting lever. The second force transmitting lever 50 is supported on the base cantilever via the second supporting joint 55, wherein, in contrast to the other embodiments, a portion of the base cantilever has to be above the second force transmitting lever 55. While this achieves decoupling of the pivot points on the second force transmitting lever, the reversed orientation of the second supporting joint 55 makes the arrangement of the lever mechanism in the base cantilever substantially more complex. In comparison to the embodiment according to FIG. 1, a greater structural height in the lever mechanism is also necessary.

Finally, FIG. 5 shows a further embodiment largely similar to the embodiment according to FIG. 4. Due to the corresponding elements, reference is made to the description of FIGS. 3 and 4. The difference between the embodiment of FIG. 5 and the embodiment according to FIG. 4 lies only in the second force transmitting lever 50, again formed as a straight lever parallel to the other force transmitting levers 36, 46 and perpendicular to the applied load L, being supported at its bottom side by means of the supporting joint 60. In comparison to FIG. 4, this makes the linkage of the lever mechanism less complex in the base cantilever. A drawback is, however, that the pivot points of the load joint 53 and the second supporting joint 60 are not arranged in a common plane oriented perpendicular to the direction of gravity. This can lead to measuring errors. Moreover, the structural height of the lever mechanism is higher.

LIST OF REFERENCE NUMERALS 1 base
2 top parallelogram link
3 bottom parallelogram link
4 load receiver
5 first link joints
6 second link joints
7 holding element
8 first force transmitting lever
9 second force transmitting lever
10 third force transmitting lever
11 cutout
12 interior of base
13 coupling element
14 load arm
15 load-receiver coupling joint
16 load joint
17 first supporting joint
18 base cantilever
19 force arm
19a partial force arm
19b partial force arm
20a force-arm coupling joint
20b force-arm coupling joint
21a second coupling element
21b third coupling element
22 load joint
23 load arm
24 second supporting joint
25 force-arm coupling joint
26 coupling element
27 load joint
28 load arm
29 third supporting joint
30 force arm
31 cantilever load receiver
32 load-receiver coupling joint
33 coupling element
34 load joint
35 load arm
36 first force transmitting lever
37 first supporting joint
38 force arm
39 load arm
40 second force transmitting lever
41 force-arm coupling joint
42 second supporting joint
43 force-arm coupling joint
44 coupling element
45 load joint
46 load arm
47 third force transmitting lever
48 third supporting joint
49 tool access opening
50 second force transmitting lever
51 coupling element
52 force-arm coupling joint
53 load joint
54 load arm
55 second supporting joint
60 second supporting joint
61 base body

The invention claimed is:

1. A weighing sensor for a scale, comprising:
a base;
a load receiver jointedly linked to the base by a parallelogram linkage;
a lever mechanism including a plurality of force transmitting levers, each including a load arm and a force arm,
wherein the plurality of force transmitting levers are supported by means of supporting joints including supporting joint pivot points on the base,
wherein the plurality of force transmitting levers are arranged one behind the other as seen in a longitudinal direction of the weighing sensor, and
wherein the plurality of force transmitting levers are two-sided levers; and
at least one pair of a plurality of coupling elements that are arranged parallel to each other and arranged adjacent to each other and connected to a same arm which is one of a load arm or a force arm of one of the plurality of force transmitting levers, wherein the same arm protrudes into a coupling element space left between two coupling elements of the at least one pair of coupling elements.

2. The weighing sensor according to claim 1, wherein the plurality of force transmitting levers are formed as straight levers.

3. The weighing sensor according to claim 1, wherein the plurality of force transmitting levers are aligned essentially parallel to each other.

4. The weighing sensor according to claim 3, wherein the plurality of force transmitting levers are aligned perpendicular to the direction of a load (L) applied to the load receiver.

5. The weighing sensor according to claim 1, wherein the lever mechanism includes a third force transmitting lever.

6. The weighing sensor according to claim 5, wherein the third force transmitting lever acts as a straight lever and is substantially orientated parallel to two of the plurality of force transmitting levers, and wherein the two of the plurality of force transmitting levers and the third force transmitting lever are arranged one behind the other in the longitudinal direction of the weighing sensor.

7. The weighing sensor according to claim 1, wherein, on the load arm of at least one of the plurality of force transmitting levers, a load joint is arranged having a load transmitting function when it receives a load having a load joint pivot point, and the load joint pivot point is in a common supporting plane with a supporting joint pivot point of the supporting joint of the associated force transmitting lever, wherein the supporting plane is substantially parallel to a link plane of a parallelogram link of a non-loaded parallelogram linkage.

8. The weighing sensor according to claim 1, wherein at least one of a plurality of coupling elements is arranged between the load receiver and a first force transmitting lever and/or between a plurality of force transmitting levers adjacent to each other.

9. The weighing sensor according to claim 8, wherein one coupling element of the plurality of coupling elements is arranged between each of the load receiver and the first force transmitting lever and between the plurality of force transmitting levers adjacent to each other.

10. The weighing sensor according to claim 8, wherein the plurality of coupling elements are aligned parallel to each other.

11. The weighing sensor according to claim 8, wherein the plurality of coupling elements are arranged parallel to a direction of a force (L) acting on the load receiver.

12. The weighing sensor according to claim 8, wherein each connection from each of the plurality of coupling elements to the load receiver or to the plurality of force transmitting levers is via a coupling element joint.

13. The weighing sensor according to claim 8, wherein the lever mechanism is designed such that as the load receiver is loaded in a preferred loading direction each of the plurality of coupling elements is loaded on tension.

14. The weighing sensor according to claim 8, wherein the lever mechanism is designed such that as a load is received each of the plurality of coupling elements transmits the force in a direction parallel to a loading direction.

15. The weighing sensor according to claim 1, wherein at least the load receiver, the base, the parallelogram linkage and at least one of the plurality of force transmitting levers are integrally formed with an extension of the force arm provided for engagement with a force compensation means that is separable from the integrally formed elements.

16. The weighing sensor according to claim 1, wherein the load receiver, the base, the parallelogram linkage and the plurality of force transmitting levers are symmetrical with respect to mirror plane defined by an X axis and a Z axis, centrally extending in the longitudinal direction of the weighing sensor.

17. The weighing sensor according to claim 1, wherein a lever extension is arranged on the force arm of a force transmitting lever most remote from the load receiver.

18. The weighing sensor according to claim 1, wherein a parallelogram link of the parallelogram linkage and/or linkage joints and/or the base has a tool access opening allowing tool access to at least a part of the lever mechanism.

19. The weighing sensor for a scale according to claim 15, wherein the force arm provided for engagement with a force compensation means has an extension.

* * * * *